Jan. 24, 1967     S. POLLOCK     3,300,048
COLANDER
Filed April 8, 1964

INVENTOR.
SAMUEL POLLOCK
BY Allan M. Shapiro

ATTORNEY

3,300,048
COLANDER
Samuel Pollock, Los Angeles, Calif.
(12941 Correnti St., Pacoima, Calif. 91331)
Filed Apr. 8, 1964, Ser. No. 358,267
5 Claims. (Cl. 210—232)

The present invention relates to kitchen utensils of the strainer type and, more particularly, to a colander.

A colander generally is a large-mouthed bowl-shaped sieve or strainer, often with handles and a base, used variously for kitchen and other purposes to separate solid objects and liquids from each other by filtering. In normal kitchen use, a food which is immersed in or otherwise associated with a liquid is poured or dumped into the colander and the liquid filters through the drain holes in the colander so that the solid portion remains relatively free from liquid. In rapidly removing the solid portion from the colander, such solid contents normally are poured out of the mouth of the colander into some other vessel or container or onto a surface. However, due to the relatively large opening or mouth at the top of the colander, pouring the contents of the colander out of the top thereof is difficult and messy as well as inaccurate as to disposition of the contents.

Accordingly, one of the objects of the present invention is the provision of a colander, with a normal large opening or mouth at the top for readily and rapidly receiving its contents to be strained, with a relatively small bottom opening and a base closure member in selectively effective closed and opened relationship with respect to the bottom opening whereby the solid contents of the colander may be dispensed through the bottom of the colander, thereby eliminating the necessity of tipping the colander and providing a relatively small pouring opening for ease, neatness and accuracy of such operation.

Another object of the present invention is the provision of a colander with a bottom opening, a pivoted base closure member, and a readily operable latch for selectively securing and releasing the closure member with respect to the bottom opening.

Figure 1:
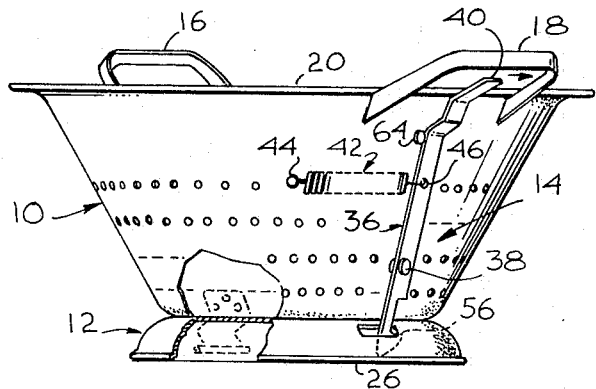
Figure 2:
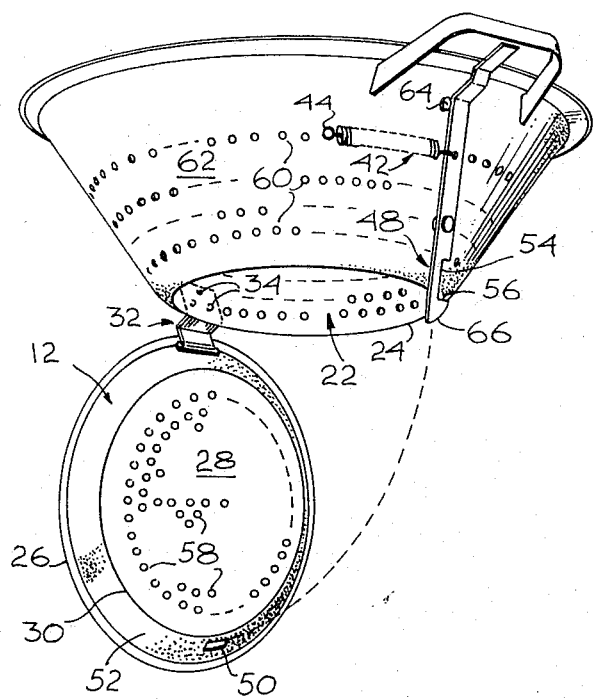

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a side perspective view, partly broken away, of a colander in accordance with the present invention, the base closure member being shown in its closed and latched position; and FIGURE 2 is a bottom perspective view thereof, showing the base closure member in its open position.

Referring to the drawings, there is seen a colander comprising a main body member 10, a base closure member 12, and latch means indicated generally at 14. The body member 10 is primarily bowl shaped and is provided with a pair of handles 16 and 18 near the top of the colander. The top rim 20 is circular and of relatively large diameter for ease in receiving the solid and liquid material to be filtered. The bottom of the body member 10 is provided with a concentric opening 22 defined by a circular bottom rim 24 having a diameter preferably somewhat less than half the diameter of the top opening rim 20.

The base closure member 12 has a circular base rim 26 for stable support of the colander during the filtering operation, and an upper surface 28 having a circular peripheral edge 30 of slightly larger diameter than the bottom opening rim 24 so that the surface 28 is adapted to seat against the rim 24 in effectively closed engagement therewith during the filtering operation to prevent the escape of the solid portion of the colander contents.

A hinge 32 is secured to the main body member 10, as by rivets 34, and to the base closure member 12 at the rolled rim 26 whereby the base closure member 12 may freely pivot about the axis of the hinge 32 into either closed engagement with the rim 24 about the bottom opening 22, as seen in FIGURE 1, or away from the opening 22, as seen in FIGURE 2, to permit the dumping of the colander contents.

The latch means 14 comprises a lever arm member 36 pivotally secured to the main body member 10 as by a rivet 38 and extending upwardly along the side of the main body member 10 and then radially outwardly therefrom so that its upper end 40 is disposed within the spatial region defined by the U-shaped handle 18 for digital accessibility by that hand of the operator that grasps the handle 18 during the unloading operation. A coiled tension spring 42 has one end loop in secured engagement as by a collet rivet 44 with the main body member 10 and the other end loop hooked into a hole 46 in the lever arm member 36 approximately midway between the handle end 40 and the pivot 38, with the spring 42 at approximately a right angle to the lever arm member 36 for urging the lever arm member 36 to pivot in the counter-clockwise direction in the aspect illustrated. The latching end 48 of the lever arm member 36 is narrower than the slot 50 provided in the side 52 of the base closure member 12 for ready insertion therethrough and is provided with a lateral notch 54 for forming a retention shoulder 56 for retained engagement of the base closure member 12 during normal colander operation. The spring 42 assures locked engagement of the lever arm member 36 with the base closure member 12 when the latter is resting upon a surface, and such spring action together with the weight of the base member 12 and the contents of the colander hold the side 52 of the base member 12 firmly upon the shoulder 56 of the lever arm member 36 when the colander is held aloft by the operator just prior to the unloading operation.

Further structure and features of the present invention will become clear when viewed in connection with the following description of the operation of the embodiment illustrated. With the colander in the position shown in FIGURE 1 and resting upon a convenient surface (not shown), the material to be filtered is poured or otherwise placed into the colander through the conveniently wide mouth defined by the large top rim 20 and the liquid is permitted to filter out of the colander through the large plurality of holes 58 in the circular surface plate 28 of the base closure member 12, as well as the holes 60 in the side 62 of the main body member 10. Preferably, the holes 60 are eliminated so that the side 62 is solid and all liquid filtering occurs through the holes 58 in the base plate 28 whereby the colander may be placed upon the circular rim of a vessel or container (not shown) for capture of the filtered liquid, if desired, as in the case of fruit or vegetable juices. However, for many colander applications, the liquid is primarily water which has been used for boiling or otherwise cooking the solid material and may be deemed waste so that the holes 60 in the side 62 may be convenient for rapid disposal of such waste. After the filtering operation is completed, the operator grasps the handles 16 and 18, lifts and conveniently disposes the colander in a convenient location for dumping or otherwise dispensing the solid contents remaining. By use of one or more fingers of the same hand that is gripping the handle 18, the operator pivots the lever arm member 36 in the direction indicated by the arrow at the upper end 40, against the action of the spring 42, so that the shoulder 56 slides out of engagement with the side 52 of the base closure member 12, thereby releasing the base closure member 12 so that it may freely pivot out of its closure engagement with the main body member 10 for release of the colander contents to any desired and convenient location.

Upon removal of the colander contents, the operator normally releases the latching lever 36 whereupon the spring 42 acts to return the lever arm member 36 until it abuts against and is stopped by a stop member 64 in the form of a rivet for limiting the return movement to a position such that the tapered end surface 66 is properly located for sliding reentry into the slot 50 in the base side 52 in the base member 10 for reclosing of the colander. The reclosing of the colander may be accomplished in any of several convenient ways such as, for example, by swinging the colander so that the base member 12 snaps into latched engagement or merely restraining the base member 12 and lowering the body member 10 thereupon.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:
1. A colander comprising:
a tapered main body member having top and bottom rims defining concentric circular top and bottom openings and provided with manually graspable handle means adjacent said top rim, said top opening being relatively large for receiving therethrough a mixture of liquid and solid contents, said bottom opening being substantially smaller than said top opening, said body member being provided with a plurality of holes for liquid filtering;
a base closure member having a circular base rim of sufficient diameter for stable support and a flat circular upper surface plate portion, said surface plate portion having a diameter substantially the same as said bottom opening for closed engagement therewith and being provided with a plurality of holes for liquid filtering;
hinge means pivotally securing one side of said base closure member to said main body member;
latch means pivotally mounted on said main body member in normally retained engagement with another side of said base closure member and selectively manually actuatable for release of said base closure member, said latch means comprising a lever arm member having an upper end thereof adjacent said handle means for manual operation and a lower end thereof provided with a shoulder, said base closure member having a slot for receiving said shoulder in interference retention of said base closure member; and
spring means attached between said body member and said lever arm member for normally urging and maintaining said shoulder in such interference retention of said base closure member.

2. A colander in accordance with claim 1 wherein said handle means is U-shaped, said lever arm member extends along said main body member and said upper lever end extends radially outwardly therefrom and is disposed within the spatial region defined by said U-shaped handle means for digital accessibility to the same hand of the operator that grasps said handle means during manual support of the colander and its contents.

3. A colander in accordance with claim 1 comprising: a stop member secured to said body member in interference relationship to said lever arm member for maintenance thereof in a latchable position when unlatched.

4. A colander in accordance with claim 3 wherein said lower lever end is provided with a tapered end surface terminating at said shoulder and adapted for sliding reentry into said slot when said base member is brought from an open to a closed position against said body member for automatic retention engagement latching of said latch means to said base means.

5. A colander in accordance with claim 4 wherein said handle means is U-shaped, said lever arm member extends along said main body member and said upper lever end extends radially outwardly therefrom and is disposed within the spatial region defined by said U-shaped handle means for digital accessibility to the same hand of the operator that grasps said handle means during manual support of the colander and its contents.

References Cited by the Examiner

UNITED STATES PATENTS

| 921,907 | 5/1909 | Stayton | 210—482 X |
| 1,950,378 | 3/1934 | Andrews | 210—470 |
| 2,636,208 | 4/1953 | Leeper | 15—257 |
| 2,747,739 | 5/1956 | Bissonnette et al. | 210—482 |
| 3,170,875 | 2/1965 | Swett | 210—471 X |

FOREIGN PATENTS

| 176,739 | 3/1922 | Great Britain. |

REUBEN FRIEDMAN, *Primary Examiner.*

C. DITLOW, *Assistant Examiner.*